W. S. HOUGH, Jr.
METHOD OF AND MEANS FOR FORMING GLASS ARTICLES.
APPLICATION FILED JUNE 3, 1916.

1,236,937.

Patented Aug. 14, 1917.
4 SHEETS—SHEET 1.

WITNESSES
Howard D. Orr
H. F. Chapman

INVENTOR,
William S. Hough, Jr.,
BY E. G. Siggers
ATTORNEY

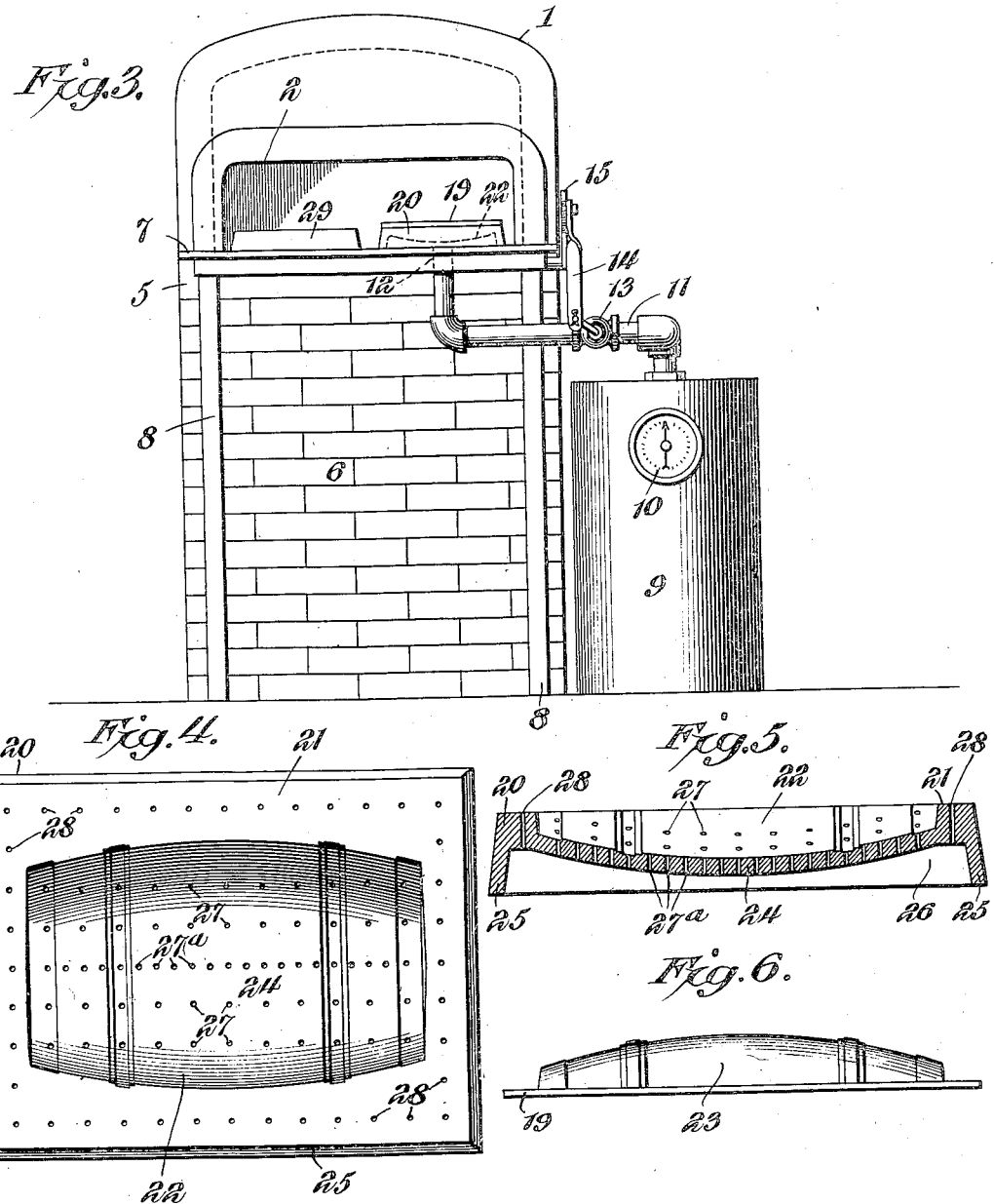

W. S. HOUGH, Jr.
METHOD OF AND MEANS FOR FORMING GLASS ARTICLES.
APPLICATION FILED JUNE 3, 1916.
1,236,937.
Patented Aug. 14, 1917.
4 SHEETS—SHEET 3.
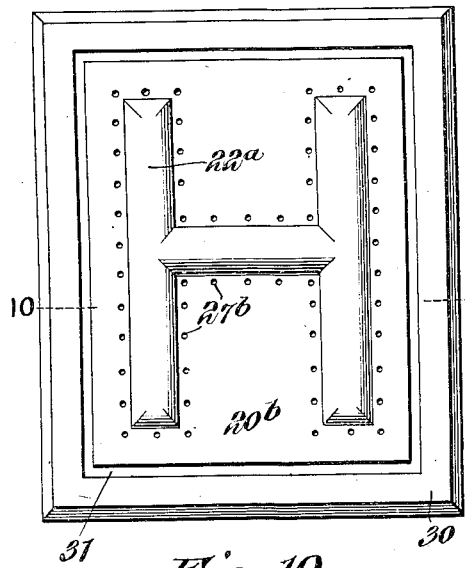
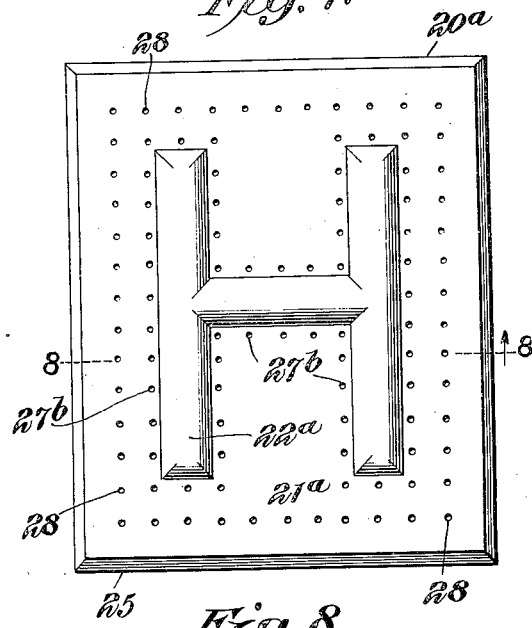
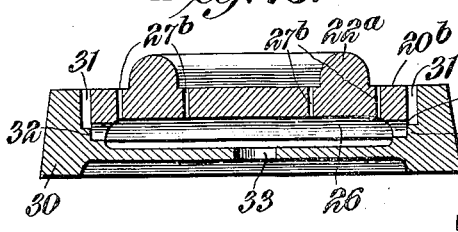
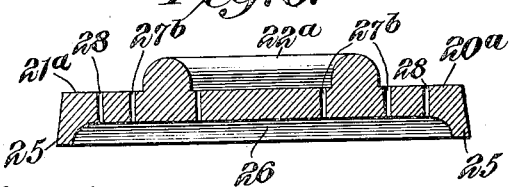
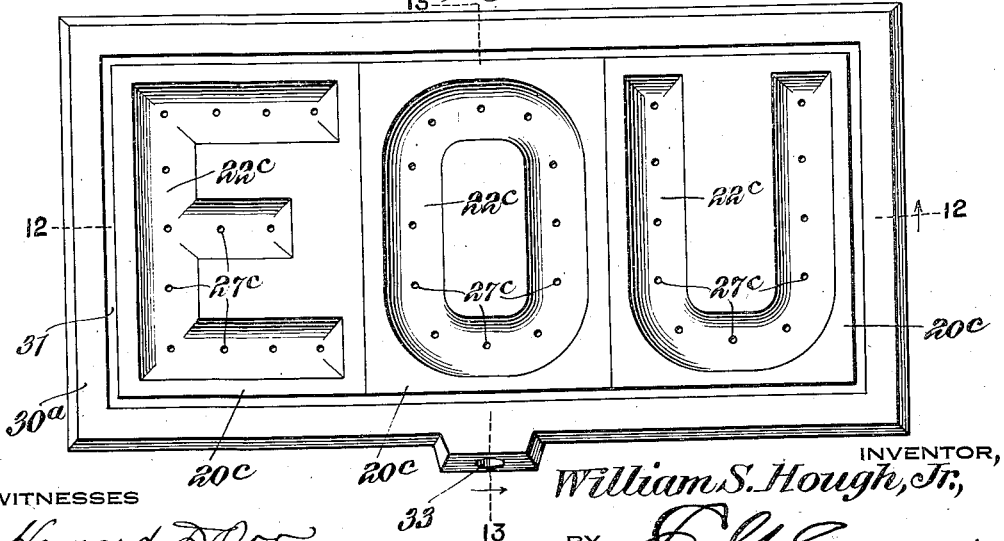
WITNESSES
Howard D. Orr.
F. T. Chapman.
INVENTOR,
William S. Hough, Jr.,
BY
ATTORNEY

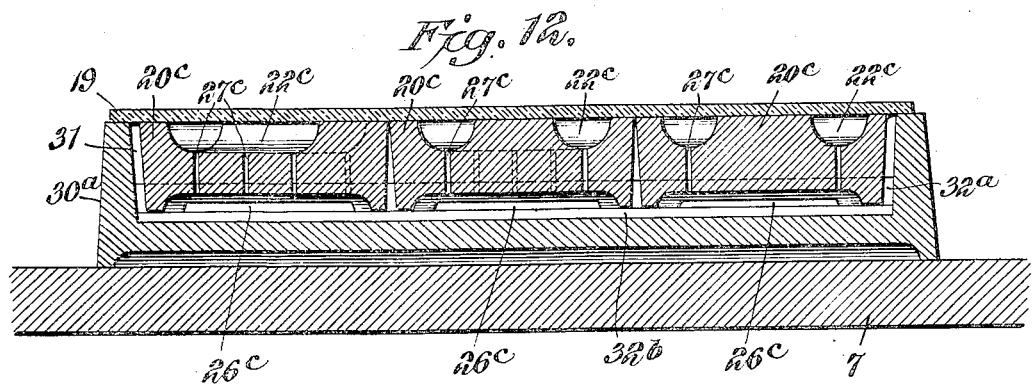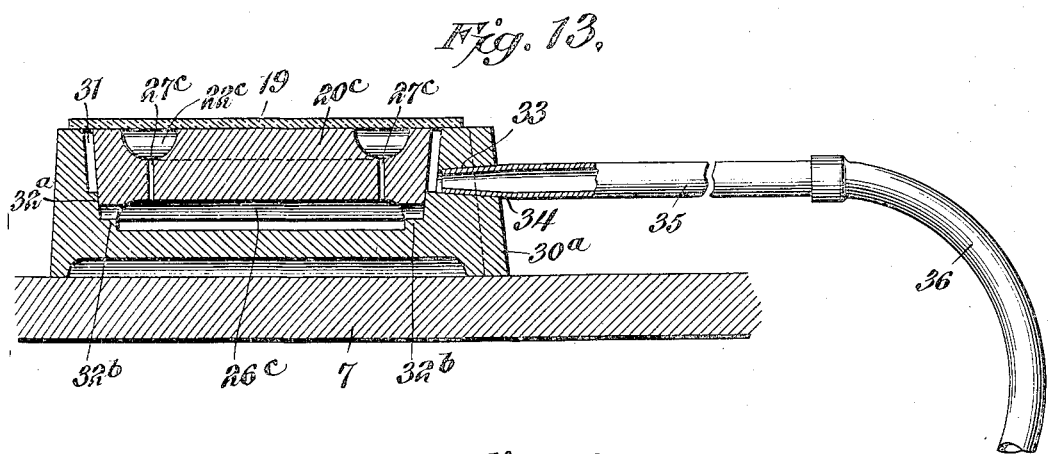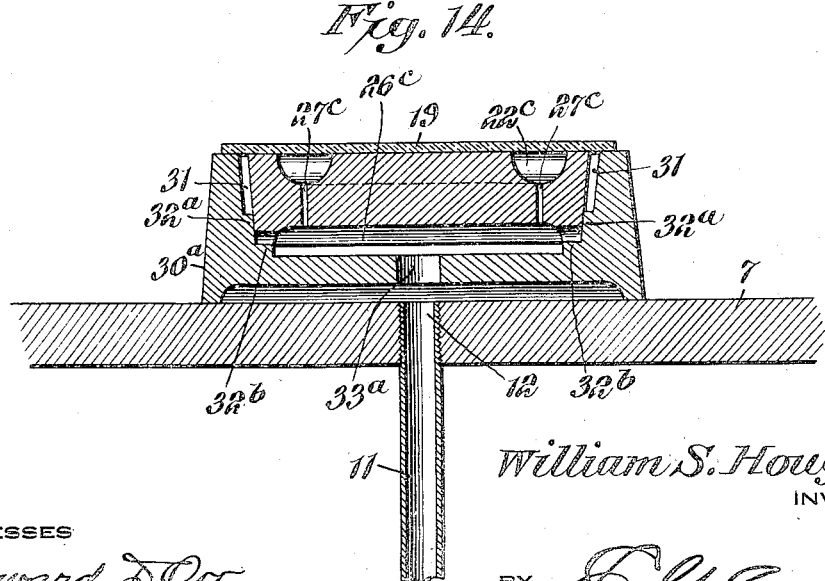

UNITED STATES PATENT OFFICE.

WILLIAM S. HOUGH, JR., OF ST. CATHERINES, ONTARIO, CANADA.

METHOD OF AND MEANS FOR FORMING GLASS ARTICLES.

1,236,937.     Specification of Letters Patent.     Patented Aug. 14, 1917.

Application filed June 3, 1916. Serial No. 101,588.

*To all whom it may concern:*

Be it known that I, WILLIAM S. HOUGH, Jr., a citizen of the United States, residing at St. Catherines, Province of Ontario, and Dominion of Canada, have invented a new and useful Method of and Means for Forming Glass Articles, of which the following is a specification.

This invention has reference to the method of and means for producing glass articles, and especially the formation of the articles from sheet glass.

The object of the invention is to expeditiously form the articles from sheet glass while the latter is softened by heat, so that the formed article is in hollow relief upon the sheet of glass with a plane or smooth portion of the sheet bordering the relief part.

The term sheet is used in the sense of applying to a plane or approximately plane structure extended in two dimensions, and relatively thin in the third dimension, and by the term glass is meant any substance having characteristics of glass in that it may be treated in the same manner as a glass sheet for the formation of portions of the sheet into hollow relief.

In accordance with the present invention the glass sheet heated to a suitable degree of plasticity is placed upon a suitable mold having a pattern of the portion to be in relief so disposed that a condition of subatmospheric pressure may be established on the mold side of the softened sheet, whereupon the latter is forced into conformity with the pattern of the mold by atmospheric pressure. At the same time, by a suitable arrangement of the mold, the glass sheet where engaging or caused to engage the mold about the pattern, is held to the mold by atmospheric pressure due to the production of subatmospheric pressure where the border portions of the glass sheet rest upon the mold. The result is that the softened glass sheet is made to adhere strongly to the border or marginal portions of the mold while those portions of the glass sheet overlying that part of the mold containing the pattern are forced into intimate conformity with the pattern by atmospheric pressure with such expedition that the effect is practically instantaneous.

The surface of the mold upon which the glass sheet is initially laid may be considered the top of the mold and the pattern is either raised above or sunken into the mold so that those parts of the pattern corresponding to the relief parts of the finished article are either above or are in sunken relation to the top of the mold. At a suitable distance from the pattern the mold is either pierced by numerous holes or passages opening through what constitutes the under or bottom wall of the mold, or the mold is so arranged that adjacent to that part of it containing the pattern there is provided a space or channel through which air may be exhausted. The holes or channels communicate with the chamber beneath the mold and inclosed either by the side walls of the mold proper or by a part of the mold designed to contain a plurality of individual molds. In either case the marginal portions of the glass sheet are held to the mold structure by atmospheric pressure, and simultaneously the glass sheet softened by heat is forced into conformity with the mold by atmospheric pressure.

The conforming of the glass sheet to the pattern is brought about by providing numerous holes or passages through the mold within the margins of the pattern or immediately adjacent to the margins of the pattern.

A mold may represent one or more indicia, but for manufacturing purposes it is often advantageous to have each mold element represent a single indicia with a receiving member for the separate mold elements by means of which a plurality of such elements may be assembled into a single structure, so that a single sheet may be formed to represent an assemblage or grouping of indicia. This is particularly valuable in the case of illuminated signs where it may be desirable to include two or more sign characters in one sheet of glass, and the invention therefore includes either a single mold element with a raised or sunken pattern therein and with a marginal series of holes or passages for holding the softened glass sheet to the mold by suction while the sheet is being conformed to the pattern, or it may include a holding member for the assemblage of two or more mold elements each containing a pattern with these elements so assembled that suction applied to the holding member will cause the glass sheet to adhere about its marginal portions to the holding member and the mold elements and at the same time conform the softened glass sheet to the assembled patterns.

By so holding the softened sheet during the formation of the glass into conformity with the pattern, the dishing and wrinkling of the edges of the sheet is avoided without the necessity of mechanically holding these parts in place, so that the formation of the glass sheets into sign elements is very expeditiously brought about, and there is no material distortion of the edge portions of the sheet.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Fig. 3 is a front elevation of the heating oven and parts associated therewith.

Fig. 4 is a plan view of one type of mold by which the invention may be practised.

Fig. 5 is a longitudinal section of the mold of Fig. 4.

Fig. 6 is a side elevation of a glass sheet with the pattern in relief in conformity with the mold of Figs. 4 and 5.

Fig. 7 is a plan view of a different form of mold from that of Figs. 4 and 5.

Fig. 8 is a section on the line 8—8 of Fig. 7.

Fig. 9 is a plan view of still another type of mold where the pattern containing portion of the mold is provided with and is separable from a surrounding container.

Fig. 10 is a section on the line 10—10 of Fig. 9.

Fig. 11 is a plan view of a mold of the type of Fig. 9, but provided with a plurality of pattern elements.

Fig. 12 is a section on the line 12—12 of Fig. 11, and showing a supporting table for the mold.

Fig. 13 is a section on the line 13—13 of Fig. 11 with a mold resting on the supporting surface and a suction nozzle applied thereto.

Fig. 14 is a section similar to Fig. 13 with the mold adapted for use with the suction apparatus shown in Figs. 1, 2 and 3.

Figure 1:
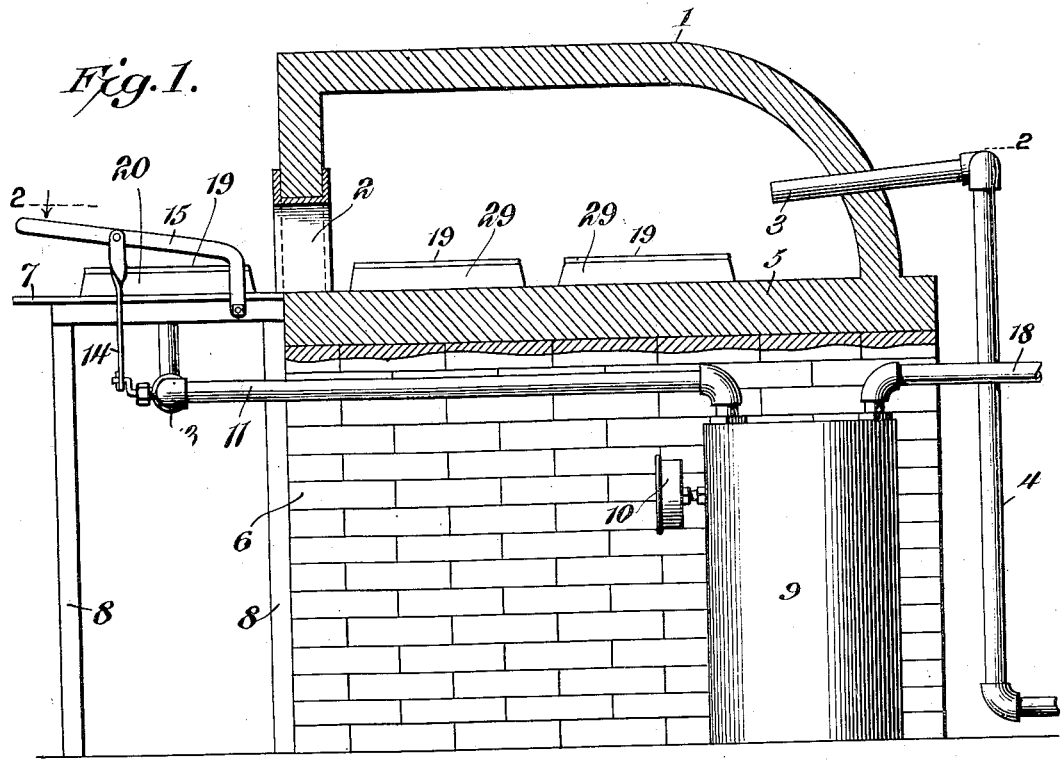
Figure 1 is an elevation of a structure for the practice of the present invention, including a heating oven shown in the figure in longitudinal vertical section.
Figure 2:
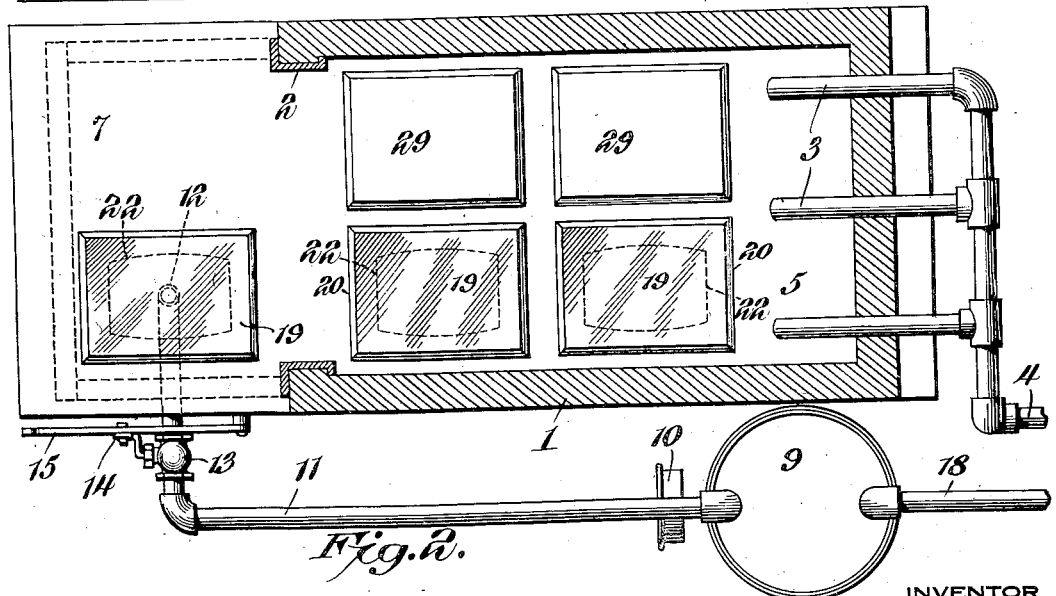
Fig. 2 is a plan view of the structure of Fig. 1 with the oven in horizontal section on the line 2—2 of Fig. 1.

Referring to the drawings, and particularly to Figs. 1 to 8, there is shown in Figs. 1, 2 and 3 a furnace 1 having at one end an entrance opening 2 and at the other end provided with burners 3 having exterior connections 4 to any suitable source of fuel, such as gas, for example. Since the interior of the furnace is to be subjected to considerable heat it is made sufficiently heavy and of sufficiently refractory material to withstand the heat, which latter need only be strong enough to soften glass without causing it to become soft enough to spontaneously flow.

The furnace is provided with a bottom member 5 supported upon a suitable base 6 indicated in the drawings as made of brick. Extending from the opening 2 is a table 7 carried by legs 8 or otherwise, and this table has its top in the same plane as the upper surface of the bottom 5 of the furnace. Furthermore, the surfaces of the bottom 5 and of the table 7 are both plane.

At one side of the furnace at some convenient point is located a tank 9 having a vacuum gage 10, and also a pipe 11 leading from the tank to and opening through the table 7 near one side thereof, as indicated at 12. In the pipe 11 there is included a controlling valve 13 having its stem connected by a link 14 to an operating lever 15 at that side of the table near where the pipe 11 opens through the top surface of the table. A desired degree of subatmospheric pressure is maintained in the tank 9 by suitable suction apparatus connected thereto by a pipe 18. The degree of subatmospheric pressure is readily ascertainable at any time by observance of the gage 10, so that the operator may be always assured of workable subatmospheric conditions.

The material to be operated upon is in the form of glass sheets indicated at 19, and these sheets are usually substantially flat sheets of suitable size.

In the structure of Figs. 1 to 5 molds 20 are provided. Such molds may vary in size and outline but for convenience of description will be considered as substantially rectangular. While different substances will answer for the formation of the molds, they may conveniently be made of iron. The mold 20 is provided with an upper plane surface 21 having within its margins and in spaced relation to the edges a depressed portion 22 corresponding to the relief design to be produced upon the glass plate 19. In the structure shown in Figs. 1 to 5 of the drawings the design is that of a low relief barrel 23, but it will be understood that any desired design may be used, the invention being particularly applicable for the formation of sign indicia in the form of letters, numbers, or the like, or of conventional, fanciful or other forms, and the characters or indicia while useful for various purposes are intended particularly for use in connection with illuminated signs. For this reason and for the sake of simplicity of description the relief designs formed on the glass sheets will hereinafter be referred to as sign characters without thereby limiting them to either specific forms or specific uses.

The depressed portion 22 of the mold 20 of Figs. 1 to 5 has a bottom wall 24 (the mold being usually horizontal,) which is somewhat elevated above the plane of the bottom of the mold by marginal walls 25 so as to provide a space or chamber 26 underlying the wall 24, such chamber being defined by the bottom 24, the marginal walls 25 and the support upon which the mold is placed. Extending through the wall 24 are numerous passages or perforations 27 distributed throughout the area of the depressed portion or portions of the mold, and these perforations may be more numerous at the deep parts of the depressed portions, as indicated at 27ª in Figs. 4 and 5. The plane upper surface 21 of the mold where surrounding the sunken pattern 22 has perforations or passages 28 opening therethrough and communicating with the space or chamber 26. The passages 28 underlie that portion of the glass plate 19 supported by the plane marginal parts of the mold.

There are also provided flat metal plates or blocks 29 of about the same size and contour as the molds 20 except that they are plane or flat throughout their entire upper surface.

One or more plates or blocks 29, and one or more molds 20 are placed in the furnace, so as to be subjected to the flames from the burners 3. Glass plates of about the same size and shape as the blocks 29 are placed thereon and after these plates have become nearly red hot the glass is moved from a block 29 on to a mold 20. Such mold with the glass plate thereon is pulled out from the furnace so as to be over the mouth 12 of the suction pipe 11 with such mouth about midway of the length and width of the mold, while the bottom edges of the walls 25 of the mold are plane to fit quite snugly on the shelf or table 7 which is also plane. Now, the operator by manipulating the lever 15 opens the valve 13, whereupon subatmospheric conditions are produced in the chamber 26 of the mold to be communicated at once through the passages 27, 27ª and 28.

The suction through the passages 28 acts upon the glass plate on the marginal or border portions of the latter around the depressed pattern 22, thus holding the edges of the glass plate firmly in place by atmospheric pressure, the softened glass snugly fitting the plane top of the mold about the pattern. At the same time subatmospheric conditions within the depressed portion or pattern 22 of the mold cause atmospheric pressure to force the softened glass into conformity with the depressed pattern as though the glass were acted upon by a plunger of corresponding form. Finally, the formed glass plate with the sign character in relief on one face is removed from the mold and placed on one of the iron blocks 29 with the relief portion of the glass uppermost, and then the iron block 29 with a glass plate on top thereof is put into an annealing oven and the operation concludes with the annealing, which in itself is a common practice, and needs no further mention.

By the present invention the same physical condition is utilized both for forcing the glass plate into conformity with the depressed or sunken portions of the mold and to hold the glass plate firmly upon the mold during the shaping of the plate into conformity with the pattern. The result is that the marginal portions of the glass plate remain flat, if such be the shape of the upper surface of the mold about the depressed portions, and special fastening of the glass plate by the use of the mechanical means for clamping glass plate to the mold is avoided.

A glass plate with a character in relief thereon as formed by the mechanism and procedure hereinbefore described is indicated in Fig. 6.

In Figs. 7 and 8 there is shown a somewhat different form of mold, which in the particular showing of the two figures is designed to produce a letter of the alphabet. In Figs. 7 and 8 there is shown a mold 20ª with a raised or relief pattern 22ª, this pattern being in the particular instance shown that of a letter of the alphabet. The mold has marginal walls 25 inclosing a chamber 26, and leading from this chamber to the top wall of the mold in immediate surrounding relation to the strokes of the letter 22ª are perforations 27ᵇ. Nearer to the margins of the mold are other perforations 28 corresponding to and performing the same office as the perforations 28 of the mold 20. The upper surface of the mold 20ª is plane, as shown at 21ª, except where the pattern is produced, for in this case the pattern is raised or in relief with respect to the surface 21ª.

The operation of the mold 20ª is similar to that of the mold 20, except that the glass sheet is placed initially upon and supported solely by the raised strokes of the character or pattern 22ª and the preliminary heating is carried to an extent which will cause the glass to soften sufficiently to settle down upon the surface 21ª, at least to an extent which will permit suction acting through the perforations 28 to grip the glass plate on to the upper surface of the mold and then suction acting through the perforations 27ᵇ brings the glass plate into flat contact with the surface 21ª closely about the strokes of the pattern and into close conformation therewith. When the glass sheet with the finished character in relief thereon is transferred from the mold 20ª to a block 29, it is unnecessary to turn the glass over, because the relief character is always uppermost.

In Figs. 9 and 10 there is shown a mold element 20ᵇ generally similar to the mold 20ª in that it has marginal walls 25 inclosing a chamber 26 and is provided with a raised pattern 22ª with the strokes closely surrounded by perforations 27ᵇ communicating with the chamber 26. The mold element 20ᵇ, however, lacks the perforations 28 of Figs. 7 and 8. Instead there is provided another mold element 30 in the form of a block with an inner cavity of a size to receive the mold element 20ᵇ and leave a channel 31 thereabout. To center the mold element 20ᵇ in the cavity within the mold element 30 the side walls of the cavity have ribs 32 outstanding therefrom to engage the marginal walls 25. The channel 31 takes the place of the perforations 28 of the molds 20 and 20ª. By providing a passage 33 through the bottom of the mold element 30, subatmospheric conditions may be established in the chamber 26 to be communicated through the channels 31 and by way of the perforations 27ᵇ to the softened glass sheet on the mold, thus holding the glass sheet in place and shaping it into conformity with the pattern of the mold by atmospheric pressure.

The channels 31 are shown in Figs. 9 and 10 as proportionately wide, so as to avoid confusion in the drawing. In practice the channels even in large molds need not be actually any larger than indicated in Figs. 9 and 10; that is, the channels are made sufficiently narrow to avoid any forcing of the glass into the channels when subjected to subatmospheric conditions.

The arrangement of Figs. 9 and 10 is particularly advantageous in the formation of the glass elements of illuminated signs because two or three or more mold elements 20ᵇ may be assembled in one holder or mold element 30. In Figs. 11 to 14 there is a holding element or block 30ª capable of containing three interchangeable mold elements and it will be understood that blocks 30ª may be made of any workable size and capacity.

It has heretofore been the custom in producing hollow relief sign characters in glass sheets to produce a single character at a time, or in the case of more extensive designs than letters or the like, special molds have been made for the purpose.

With the arrangement of Figs. 9 to 14, and especially Figs. 11 to 14, all that is needed is a suitable stock of separate mold elements 20ᵇ or 20ᶜ and a stock of mold elements 30ª to which the elements 20ᵇ or 20ᶜ are adapted. In this way two or more elements 20ᵇ or 20ᶜ may be assembled in a single mold element 30ª of appropriate size, and by placing a glass sheet of appropriate size upon the mold element 30ª containing a plurality of mold elements 20ᵇ of Figs. 9 and 10, or in the showing of Figs. 11 to 14, mold elements 20ᶜ, which may have the designs sunken therein, a plurality of sign characters are readily producible in a single sheet of glass at one operation. The mold elements 20ᵇ or 20ᶜ are interchangeable, so that any number or arrangement of sign characters may be produced in a single sheet of glass so long as the arrangement remains within workable limits.

In the showing of Figs. 11 to 14 the mold elements 20ᶜ have a sunken pattern 22ᶜ with perforations 27ᶜ in their deep parts extending through the bottom wall of the mold element 20ᶜ similarly to the arrangement of Figs. 4 and 5. Each holding or containing mold element or frame 30ª has interior ledges or ribs 32ª and 32ᵇ, the ribs 32ª extending inwardly from the inner walls of the mold element 30ª and the ledges or ribs 32ᵇ rising from the bottom wall of the interior of the mold member 30ª, so that each mold element 20ᶜ is raised above the bottom of the interior cavity of the holding mold member or block 30ª and is spaced from the sides thereof by the ribs 32ª, thereby forming channels 31 surrounding the entire group of mold elements 20ᶜ lodged within the block 30ª.

In the structures shown in Figs. 12 to 14 the bottom wall of the frame or mold member 30ª is raised above the plane of the bottom of the frame and between the upper surface of the bottom member of the frame and the bottom surface of each mold element 20ᶜ is a chamber 26ᶜ.

In the structure of Figs. 11 to 13, and particularly shown in Figs. 11 and 13 the mold member or frame 30ª has a passage 33 through one side wall adapted to receive the taper extremity 34 of a pipe 35 to the other end of which there is connected a hose 36 which may be assumed to be in turn connected to the suction tank 9 or to any other means for establishing subatmospheric pressure within the hose 36 and pipe 35.

With an arrangement such as shown in Figs. 11 and 13 the mold may remain within the furnace, and while the glass is being heated therein the taper end 34 of the pipe 35 may be introduced into the passage 33 of the mold without the necessity of removing the mold from the furnace and the glass sheet as softened may be caused to conform to the mold by reason of the subatmospheric conditions thus established. This is advantageous because the glass cools very quickly when withdrawn from the furnace. The best working conditions demand a close approach to a critical temperature, especially where the mold and the glass sheet are withdrawn from the furnace before the suction is applied. If this suction be applied while the mold and the glass sheet are within the furnace the degree of care otherwise needed to produce proper working conditions is not necessary because the operator does not have to allow for any chilling of the glass before the subatmospheric conditions are established. For this reason the arrangement of Figs. 11 and 13 is advantageous.

When the suction procedure of the arrangement of Fig. 1 and other figures of the drawing is followed, then the mold frame or element 30ª has a passage 33ª through its bottom wall, so that suction established through the opening 12 in the table 7 by way of the pipe 11 may be utilized.

In all the different forms of mold structure shown in the drawings provision is made for the establishment of a marginal holding suction for the glass sheet so related to the suction arrangements for conforming the glass sheet to the pattern that the marginal portions of the glass sheet are held firmly to the mold during such conformation of the sheet to the mold.

In the arrangement where the suction is applied outside of the heating zone the meeting surfaces of the molds and the table 7 must be made to fit with sufficient accuracy to prevent any material leakage. This, of course, means machining of the parts which is expensive. In the structure of Figs. 11 to 13 no machining of the bottoms of the molds is needed, for the suction is through the taper end or nozzle 34 of the pipe 35, so that not only is the molding operation advantageous in being performed within the furnace, but the first cost of the molds is correspondingly lessened.

While in the foregoing description the term sign character has been employed for simplicity of language, it is to be understood that sign characters are but one form of the articles which may be made in accordance with the present invention. While in illuminated signs letters, numbers, and the like, are employed, it is also customary to produce medallions or ornamental configurations of glass, the surfaces of which may have lettering or other indicia produced thereon by painting or other methods, but the medallion itself is made of glass, with parts in relief produced in the manner hereinbefore described.

Furthermore, the invention is applicable for the production of shallow dishes and various glass articles, so that the invention is capable of producing a great variety of articles or formations in relief in addition to those articles or formations which would be strictly included under the term sign character.

What is claimed is:—

1. The method of forming glass sheets softened by heat into glass articles having relief formations on one face, consisting in establishing a condition of subatmospheric pressure on that face of the sheet on which the relief portions are to be formed while the sheet is supported by a mold, with the area of subatmospheric conditions extending beyond the outlines of the relief portion and acting perpendicularly to the face of the sheet, whereby the sheet is held securely flat against the mold about its marginal portions while being conformed to those parts of the mold corresponding to the formation to be produced in relief on the glass sheet.

2. The method of forming glass sheets into glass articles in relief, consisting in softening the glass sheet by heat to a degree less than that causing spontaneous flow, and while the sheet is upon a mold, subjecting that face of the softened glass sheet remote from the face to be formed into relief to the action of atmospheric pressure by establishing subatmospheric conditions on the other or mold face of the softened glass sheet, and at the same time producing subatmospheric conditions on the mold face of the glass sheet interior to the margins of the mold and exterior to the outlines of the article which the mold is designed to form, whereby the marginal portions of the glass sheet are held in firm face contact with the mold by atmospheric pressure while the glass sheet is being conformed to the mold design by atmospheric pressure.

3. The method of producing portions in relief on glass plates of greater area than the said relief portions, consisting in supporting the glass plate in a condition of plasticity produced by heat upon a mold containing a pattern of the relief portion and other portions exterior to the pattern, and applying suction through the mold upon the surface of the glass plate toward the mold to cause conformation of the softened plate to the pattern and at the same time holding the glass plate exterior to the pattern in firm face contact with the mold by suction.

4. The method of holding softened glass plates in face contact with molds while being formed with portions in relief interior to the held portions of the plates, which consists in establishing subatmospheric conditions between the marginal portions of one face of a glass plate and the corresponding face of the mold, whereby such marginal portions of the glass plate are held solely by atmospheric pressure to and against displacement on the mold.

5. The method of forming glass plates softened by heat with portions in relief projecting from one face of the plates, consisting in subjecting the softened glass plate while upon a mold having an article conformation sunken therein, to the action of atmospheric pressure both over the area of the sunken portion and outside of such area by producing subatmospheric conditions within the sunken portions of the mold and also between such sunken portions and the margin of the mold, whereby that face of the glass plate toward the mold is forced theretoward by atmospheric pressure with the marginal portions of the same face of the glass plate held firmly against the mold by atmospheric pressure during the action of atmospheric pressure upon the glass plate where overlying the sunken portions.

6. The method of producing sign characters or other formations in relief upon glass sheets or plates, which consists in subjecting the glass sheet upon a mold of the formation to softening heat and then subjecting the softened glass sheet while on the mold to the action of atmospheric pressure to cause the sheet to conform to the mold and at the same time subjecting the portions of the sheet exterior to the sign character or other configuration to subatmospheric pressure to hold the marginal portions of the sheet against distortion due to the formation interior to said held portion into conformity with the mold.

7. The method of producing sign characters or other formations in relief upon glass sheets or plates while the latter are softened by heat, which consists in subjecting the glass sheet while upon a mold to the softening action of heat, then withdrawing the mold and glass sheet from the heating zone, and then establishing subatmospheric conditions between the softened glass sheet and the mold both within the area of the relief part to be formed and between such part and the margins of the sheet, whereby the marginal portions are held upon the mold against displacement while the remainder of the glass sheet is being conformed to the mold.

8. The method of forming glass sheets or plates with sign characters or other formations in relief, which consists in subjecting the glass sheet, while upon a mold containing a pattern of the said formation, to the action of softening heat and while the mold and glass sheet are within the heating zone establishing subatmospheric conditions between the glass sheet and the mold to cause a conformation of the glass sheet to that portion of the mold containing the pattern of the said formation, and also establishing subatmospheric conditions exterior to that portion of the mold containing the said formation and adjacent to the margins of the glass sheet, whereby such marginal portions of the glass sheet are held in contact with the mold and against displacement while the portions of the sheet interior to the marginal portions are being shaped into conformity with the pattern of the sign character or other formation.

9. A means for the formation of glass plates into articles having relief portions on one face of the glass plates, comprising a mold having a face designed to receive and support a glass plate with the same face provided with a pattern of the relief portions of the design into which the article or articles are to be formed, and said mold having passages therethrough to the pattern portions and the marginal portions for the establishment of subatmospheric conditions between the mold and that face of the glass plate toward the mold to cause conformation of the glass plate when softened by heat to the pattern in the mold and to hold that portion of the face of the mold exterior to the area represented by the pattern in firm face contact with the mold by atmospheric pressure due to the production of subatmospheric pressure through the mold to the face of the softened glass plate toward the mold.

10. A means for the production of sign characters or other formations in relief upon glass sheets or plates, comprising a mold element with a cavity formed therein and another mold element or elements adapted to be assembled in the first mold element with the outer walls in spaced relation to the inner walls of the first mold element to provide spaces or channels between the mold elements, and means for causing the production of subatmospheric pressure in said channels or spaces and also between a glass sheet resting upon the mold and those portions of the mold containing a pattern of the formation or formations to be produced.

11. A means for the production of a multiplicity of formations or parts thereof upon a single glass sheet, comprising a plurality of interchangeable mold elements each containing the pattern of a formation or part thereof, and a holding element for the interchangeable elements having means for spacing each interchangeable element from the holding element to provide a marginal channel about the assembled interchangeable elements, whereby subatmospheric pressure produced within the mold will act upon the glass sheet softened by heat to conform it to the patterns of the said formations or elements thereof and at the same time act upon the glass sheet through the marginal channels of the mold to hold the sheet into firm contact with the mold and prevent its distortion due to the conformation of the sheet to the patterns of the said formations.

In testimony, that I claim the foregoing as my own, I have hereto affixed my signature in the presence of two witnesses.

WILLIAM S. HOUGH, Jr.

Witnesses:
A. J. Crofts,
A. R. White.